Patented Feb. 10, 1925.

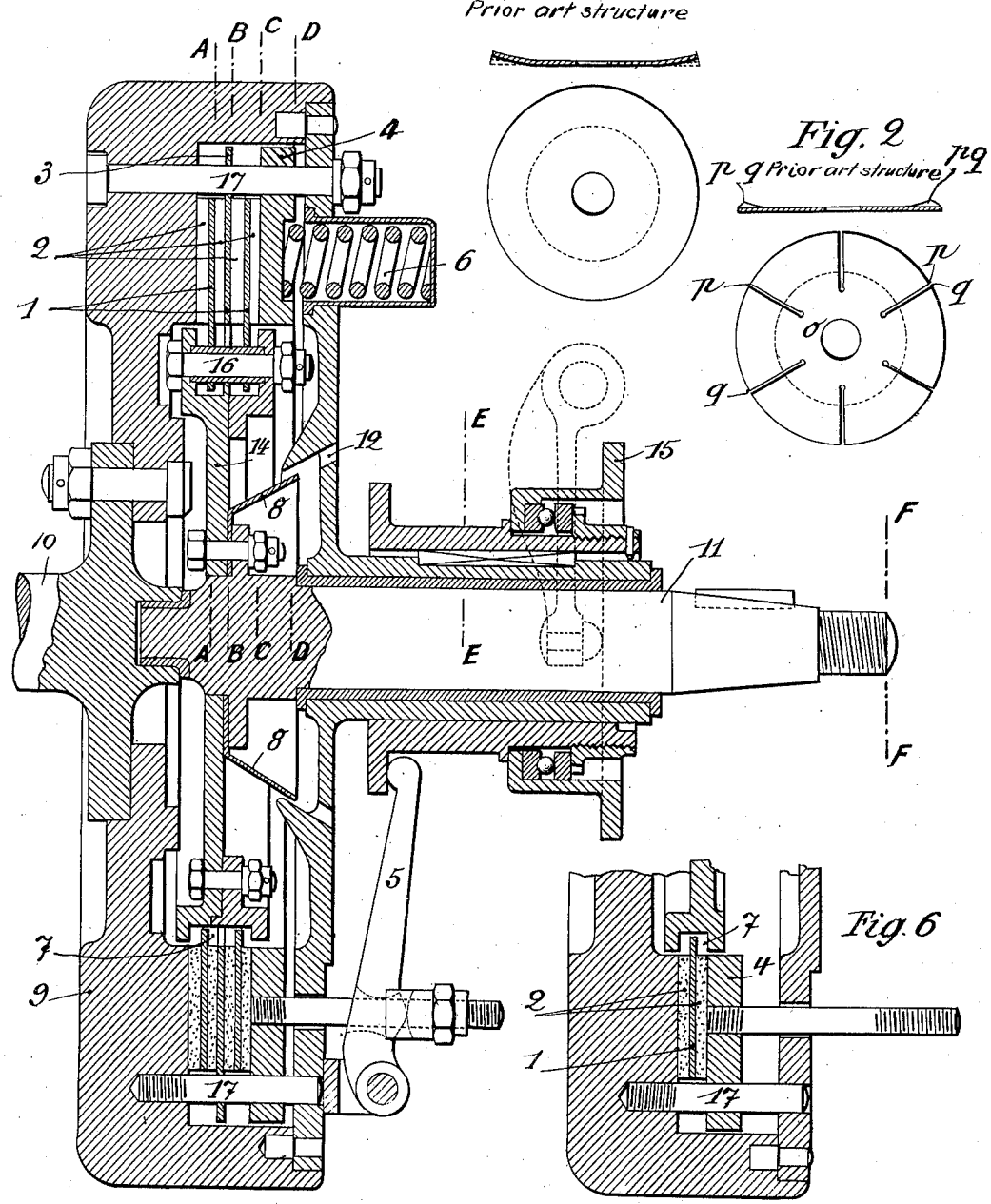

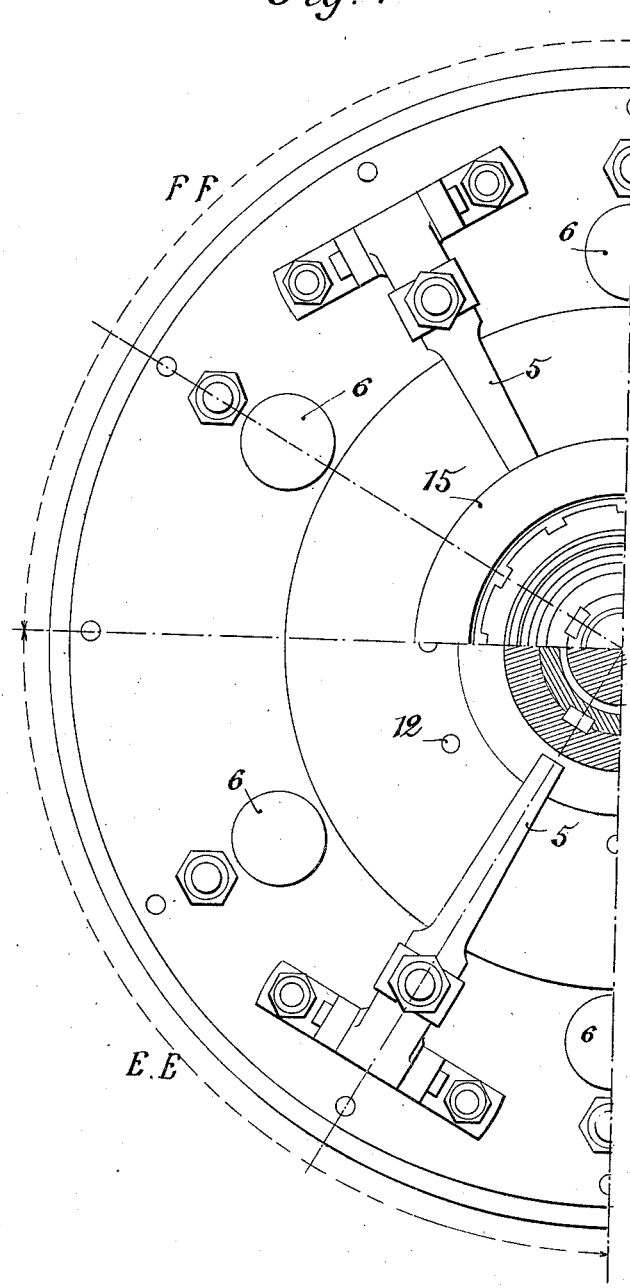

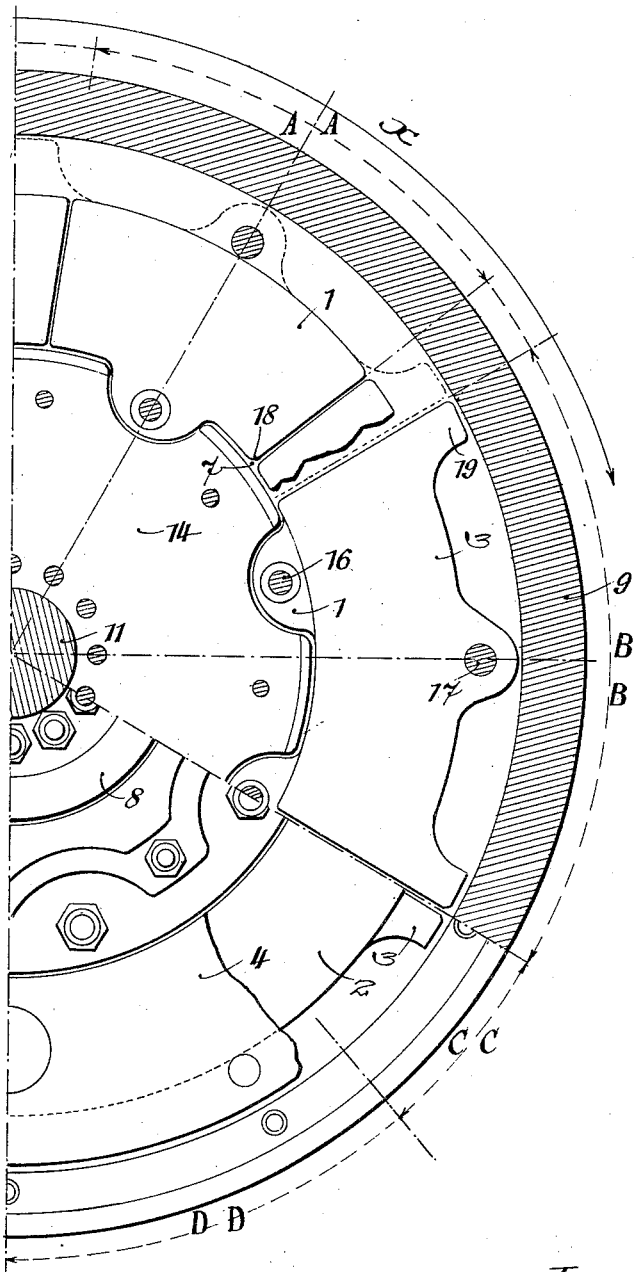

1,526,203

UNITED STATES PATENT OFFICE.

EUGÈNE BUISSON, OF PARIS, FRANCE, ASSIGNOR TO SOCIETE ANONYME FRANCAISE DU FERODO, OF PARIS, FRANCE.

FRICTION CLUTCH WITH MULTIPLE DISKS.

Application filed March 1, 1922. Serial No. 540,211.

*To all whom it may concern:*

Be it known that I, EUGÈNE BUISSON, a citizen of the Republic of France, and residing at Paris (Seine Department), No. 2 Rue de Chateaudun, in the Republic of France, have invented certain new and useful Improvements in Friction Clutches with Multiple Disks, of which the following is a specification.

This invention relates to an improvement in friction clutches wherein disks are employed in order to obviate the drawbacks resulting from the differences in the heating of various points at the surface of the said disks which give rise to unequal expansions between the centre and the periphery, thus resulting in deformation. To this effect, each metal disk is replaced by a plurality of independent segments wherein the linear expansion can freely take place.

The accompanying drawing shows by way of example a form of construction of a clutch according to this invention.

Figs. 1 and 2 show in section and in elevation the types of metal disks of known construction.

Fig. 3 is a lengthwise section of the proposed clutch.

Figs. 4 and 5 show various cross-sections on the lines A—A, B—B, C—C, D—D, E—E and F—F of Fig. 3.

Fig. 6 is a partial lengthwise section of the clutch with a single metal disk.

The clutches of the proposed type with interposed friction disks may be of two kinds:

(*a*) The number of actuated metal disks is at least two.

(*b*) A single metal disk is actuated.

In case *a*, there are employed three or more actuating metal disks, and four or more friction disks, which are loosely placed in alternate disposition between the actuating and actuated disks.

In case *b*, there are used only two actuating metal disks and two friction disks disposed as in the preceding case.

It is naturally desired to provide for the actuated portion of the clutch a revoluble member having the lightest possible construction. Furthermore, for reasons of economy, manufacturers will preferably make use of the clutch *b* with a single actuated metal disk. This cannot however be carried out without serious drawbacks, since the external diameter of the disks will become relatively large for a relatively small power transmission. The actuated disk is in fact generally made in a single piece. The heat of friction is much greater at the periphery than at the centre of the disk; the linear expansion cannot take place in the normal manner, and moreover the metal generally in use, steel for clockwork springs, is a bad conductor of heat. The disk is put out of shape, that is, being at first a plane disk it will then assume a convex shape resembling that of a peripheral cap, as shown in Fig. 1.

The contact between the surfaces will become insufficient, the entraining will no longer take place, and the friction disks, being submitted to a violent effort of compression at the inner and outer portions of their surface, will soon become destroyed.

Efforts have been made to obviate these drawbacks by dividing the metal disk into segments as shown in Fig. 2. The drawbacks are now reduced, but still continue to exist. While it is true that the central portion of the segments *o* remains plane, the edges *t*, *q* will deviate therefrom, and for lack of suitable friction surface the entraining action will remain imperfect.

In the device according to the invention, 10 is the driving shaft, 9 the flywheel upon the same, and 11 the actuated shaft. On the said shaft 11 is mounted a solid disk 14 having at the periphery a groove 7 wherein are disposed the metal disk or disks to be actuated. These disks 1 are composed of a plurality of segments, for example eight in number which are maintained in the groove 7 by the tempered bolts and pins 16. Through the medium of these disks 1, the said bolts will draw along the member 14 and consequently the shaft 11. The groove 7 has the proper width to afford a sufficient lengthwise motion for the segments 1 in order to effect the clutching or the unclutching, and to take up the wear. If the clutch is of the type *a*, that is, having more than one actuated metal disk, it will be necessary to provide a corresponding number of actuating metal disks. The said disks are formed of the segments 3 actuated by the bolts 17. Between the disks 1 and 3 are arranged friction disks 2 made of any suitable material. The said friction disks 2 are formed of a plurality of independent peripheral segments which are disposed upon the actuated and actuating members in such manner that they are interposed between the disks 1 and 3. Should the drive take place in the sense of the arrow $x$ (Fig. 5), the segments 1 will bear at their edge 18 upon the bottom of the groove, 7, and the segments 3 will bear at their edge 19 along the internal wall of the flywheel.

The compressing disk 4 impelled by the springs 6, is also movable in the lengthwise sense, it is controlled by the slidable sleeve 15 actuating the levers 5 as in the known devices.

This arrangement will afford the following results:

1. The linear expansion of the actuating and actuated disks may be freely effected. The disks will remain in the plane shape in all cases, irrespective of the effort of friction to which they are submitted.

2. The said clutch may be constructed with one or more metal actuating or actuated disks.

3. The actuated shaft 11 is not subjected to a longitudinal displacing motion during the clutching or unclutching or in case of wear.

No precautions need be taken as regards the compressing disk 4, since the mass of the said disk is sufficient to store up a considerable quantity of heat. A shield 8 is provided in order to prevent any oil from reaching the disks, and the oil collected is discharged to the outside through the orifices 12. The friction disks 2 which are made for example of Ferodo metal may be mounted loose or may be secured to the actuating or actuated metal disks, and preferably to the former.

Claims:

1. In a disk clutch, the combination of a driving member, a driven member, metal disks respectively secured to the driving and driven members, the said disks being divided into independent peripheral segments, securing pins on the driving and driven members, a single securing pin being provided for each segment, friction disks divided into segments and interposed between the metal disks, and means used for exerting a pressure upon all of the disks.

2. In a disk clutch, the combination of a driving member, a driven member, metal disks respectively secured to the driving and driven members, the said disks being divided into independent peripheral segments, a single securing pin being provided for each segment, grooves provided in these members in which the said segments are arranged, shoulders carried by these segments through which they bear against the bottoms of said grooves, friction disks divided into segments and interposed between the said metal disks, and means for exerting a pressure upon all of the disks.

In testimony that I claim the foregoing as my invention, I have signed my name in presence of two subscribing witnesses.

EUGÈNE BUISSON.

Witnesses:
 CAMELLE BEETRY,
 MAURICE ROWE.